United States Patent [19]

Durney Cronin et al.

[11] Patent Number: 5,093,449
[45] Date of Patent: * Mar. 3, 1992

[54] STYRENE-BUTADIENE LATEX COMPOSITIONS

[75] Inventors: Rebecca L. Durney Cronin, Townsend, Del.; W. Scott Rutherford, Concord; James F. Campbell, Cornelius, both of N.C.

[73] Assignee: Reichhold Chemicals, Inc., Durham, N.C.

[*] Notice: The portion of the term of this patent subsequent to Oct. 24, 2006 has been disclaimed.

[21] Appl. No.: 426,318

[22] Filed: Oct. 24, 1989

Related U.S. Application Data

[63] Continuation-in-part of Ser. No. 220,588, Jul. 18, 1988, Pat. No. 4,876,293.

[51] Int. Cl.⁵ .................. C08F 220/10; C08F 222/16; C08L 33/04; C08K 3/26

[52] U.S. Cl. .................... 526/318; 523/122; 524/426; 524/427; 524/522; 524/523; 524/533; 524/555; 524/556; 524/558; 524/559; 524/819; 524/820; 524/821; 524/822; 524/823; 524/828

[58] Field of Search ................ 523/122; 524/426, 427, 524/522, 523, 533, 555, 556, 558, 559, 819–23, 828; 526/318

[56] References Cited

U.S. PATENT DOCUMENTS

| | | | |
|---|---|---|---|
| 3,472,808 | 10/1969 | Isgur et al. | 524/555 |
| 3,903,035 | 9/1975 | Affeldt et al. | 525/222 |
| 4,076,293 | 10/1980 | Durney et al. | 526/318 |
| 4,199,490 | 4/1980 | Kamiya et al. | 525/99 |

Primary Examiner—Herbert J. Lilling
Attorney, Agent, or Firm—Rodman & Rodman

[57] ABSTRACT

A styrene-butadiene composition containing about 0.1 to 10 weight % of a monoester of maleic acid or fumaric acid provides improved bonding strength. In addition, small amounts of a functional monomer can also be included.

10 Claims, No Drawings

STYRENE-BUTADIENE LATEX COMPOSITIONS

This application is a continuation-in-part of application Ser. No. 220,588 filed July 18, 1988 and now U.S. Pat. No. 4,876,293.

BACKGROUND OF THE INVENTION 1 1. Field of the Invention

This invention relates to improved styrene-butadiene latex compositions with enhanced bonding strength, for various uses such as a carpet-backing adhesive, binder for non-woven fabrics, paper coating latex and paper saturant.

2. Description of the Prior Art

U.S. Pat. No. 3,281,258 to Callahan discloses the use of rubbery copolymers of styrene and butadiene in the context of a gel latex wherein the gelling is produced by steaming a frothed latex, and back coated to a carpet or rug.

U.S. Pat. No. 4,595,617 to Bogdany discloses latex or emulsion compositions of vinyl chloride and/or vinylidene chloride polymer or copolymer with filler and emulsified plasticizer frothed and used to coat and impregnate the back of a carpet which can be precoated by a carboxylated butadiene-styrene copolymer latex composition.

U.S. Pat. No. 3,472,808 to Isgur discloses diene copolymer latices formed by copolymerizing (1) a conjugated diene, such as butadiene or isoprene, (2) at least one monomer of the formula

wherein R is a phenyl or cyano group, such as styrene or acrylonitrile, (3) vinylidene chloride, and (4) a functional monomer such as acrylamide, methacrylamide, octyl acid maleate and monoethylenically unsaturated monocarboxylic and dicarboxylic acids.

U.S. Pat. No. 4,381,365 to Mishiba et al discloses a copolymer latex obtained by copolymerization of an aliphatic conjugated diene monomer, an ethylenically unsaturated carboxylic acid monomer and a monoolefinic monomer.

U.S. Pat. No. 4,420,599 to Seki et al discloses a process of producing a copolymer of an aromatic vinyl compound and maleic anhydride by adding half-ester maleate in two or more steps to the aromatic vinyl compound to perform the copolymerization reaction, and dealcoholating the unit of the half-ester maleate in the resulting copolymer to cyclize.

Also of interest is Dymicky et al which discloses a method for the preparation of n-Monoalkyl Maleates and n-Mono-and Diaklyl Fumarates, in ORGANIC PREPARATIONS AND PROCEDURES INT, vol. 17, no. 2, pages 121-131 (1985).

SUMMARY OF THE INVENTION

The present invention is based upon the discovery that a styrene-butadiene composition containing about 0.1 to 10 weight % of a monoester of maleic acid or fumaric acid provides improved bonding strength to a matrix or substrate. In addition, small amounts of a specialty monomer such as a carboxylic acid or n-methylolacrylamide can also be included.

DESCRIPTION OF THE PREFERRED EMBODIMENTS

In accordance with the present invention, it has been found that a polymer emulsion of styrene-butadiene, with a monoester of maleic acid or fumaric acid provides increased bonding strength, as an adhesive with applications in the textile and rug industry, paper industry as a non-woven binder, or a pressure sensitive additive.

More specifically, the styrene component is the preferred embodiment of an aromatic nucleus that can contain about 6 to 10 carbon atoms. An alkenyl group can also be directly linked to the aromatic nucleus, with the alkenyl group preferably containing about 2 to 4 carbon atoms. The styrene component can vary from about 2 to 90 weight %, preferably 30 to 80 weight % and most preferably 40 to 75 weight % by weight of the total composition.

The butadiene component is the preferred embodiment of an open chain aliphatic conjugated diene containing about 4 to 9 atoms and can vary from about 15 to 98 weight %, preferably about 20 to 70 weight % and most preferably about 25 to 60 weight % by weight of the total composition.

The monoester of maleic acid or fumaric acid, also known as monoester maleate or monoester fumarate has the following structural formula:

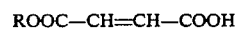

wherein R is a $C_1$ to $C_{12}$, preferably a $C_1$ to $C_4$ alkyl group.

The monoester of maleic or fumaric acid can vary from about 0 to 10 weight %, preferably about 0.5 to 5 weight %, and most preferably about 1 to 4 weight % of the total composition.

The inventive composition can also contain up to about 10 weight %, preferably about 0.05 to 7 weight %, and most preferably about 0.1 to 5 weight % of a functional monomer such as a carboxylic acid, hydroxyl containing acrylic and methacrylic monomers, amides, and acrylic and methacrylic acid derivatives.

The inventive composition specifically excludes halogenated monomers such as vinylidene chloride, disclosed as a component in the invention of U.S. Pat. No. 3,472,808 to Isgur, and other halogenated monomers such as vinyl chloride, vinyl fluoride, vinyl bromide, vinylidene bromide, vinylidene fluoride and the like.

The carboxylic acids include acrylic acid, methacrylic acid, monomethyl itaconate, itaconic acid, fumaric acid, maleic acid, beta-carboxyl ethyl acrylate and mixtures thereof.

Crosslinking agents such as difunctional vinyl compounds and derivatives, divinyl benzene, N-methylol acrylamide, $C_1$-$C_4$ ethers of N-methylol acrylamide, diallyl maleate, di, tri, and tetra (meth)acrylates can be included in amounts up to 7 weight %, preferably 0.05 to 5 weight % of the total composition.

The following examples illustrate specific embodiments of the present invention. In the examples and throughout the specification, all parts and percentages are by weight, unless otherwise indicated.

EXAMPLE 1

The following polymer formulations were prepared in accordance with the following procedure:

| Component | Weight Percent | | |
|---|---|---|---|
| | Formula A | Formula B | Formula C |
| Styrene | 63 | 63 | 63 |
| Butadiene | 35 | 35 | 35 |
| Monomethyl itaconate | — | 2 | — |
| Monomethyl maleate | 2 | — | — |
| Acrylic acid | — | — | 2 |

60 parts per hundred parts of monomer (phm) of demineralized water were contacted with 0.05 phm ethylene diamine tetraacetic acid (EDTA), 0.1 phm sodium dicyclohexyl sulfosuccinate, 0.1 phm ammonium persulfate, 2.0 phm of a butadiene-styrene (BD/ST) seed latex (particle size 600 angstroms) in a continuous stirred tank reactor (CSTR). Added to this mixture was 6.3% styrene, 3.5% butadiene, 0.06 phm t-dodecyl mercaptan, and 2% of the carboxylic acid component: monomethyl maleate in Formula A, monomethyl itaconate in Formula B and acrylic acid in Formula C.

The mixture was heated to 195° F. and maintained at that temperature for the remainder of the reaction. A mixture of 56.7% styrene, 31.5% butadiene, and 0.54 phm t-dodecyl mercaptan was then fed continuously into the reactor over a period of 5 hours. At the same time a mixture of 0.3 phm sodium dicyclohexyl sulfosuccinate and 10 phm of demineralized water was fed continuously for 5 hours into the CSTR, and a mixture of 0.7 phm ammonium persulfate with 20 phm demineralized water was also fed into the CSTR for 5.5 hours. The reaction was polymerized to 98% conversion and cooled. The pH was adjusted to 8.0-8.5 with ammonia.

In compounding the latexes for the purpose of coating a carpet, the pH of each latex was adjusted to 8.8 to 9.2 with ammonia. Up to 50 ppm of a suitable biocide was added to control contamination, along with up to 0.25% of antioxidant to control aging. 425 pts of dry calcium carbonate (calculated on 100 parts dry latex) was then added to the latex to bring the total system solids to 82.5%. 0.5 to 1.0 part (dry) of sodium lauryl sulfate was then added to the compound latex, and the viscosity was increased to 14,000-15,000 centipoise (cps) with sodium polyacrylate thickener. The latex was then foam coated onto the reverse side of a tufted carpet and then dried and cured in a 270°-300° F. oven for 5-10 minutes. Each carpet coated with the different formula latex was tested for delamination strength in accordance with ASTM D 3936, with the results tabulated as follows:

| ASTM D 3936 | Formula A | Formula B | Formula C |
|---|---|---|---|
| Delamination strength, lbs/3 in | 20.8 | 18.9 | 19.9 |

It is noted that the best delamination strength was obtained with the carpet coated with polymer latex Formula A. The improvement in delamination strength provides the carpet manufacturer with processing advantages in assembling the carpet, and increases the life expectancy of the carpet.

EXAMPLE 2

Three polymer compositions were formed with the following components in accordance with the following procedure:

| Component | Weight Percent | | |
|---|---|---|---|
| | Formula D | Formula E | Formula F |
| Styrene | 63 | 63 | 63 |
| Butadiene | 35 | 35 | 35 |
| Monomethyl maleate | 2 | — | — |
| Monomethyl itaconate | — | 2 | — |
| Acrylic acid | — | — | 2 |

60 phm of demineralized water were contacted with 0.05 phm EDTA, 0.1 phm sodium dicyclohexyl sulfosuccinate, 0.6 phm sodium salt of condensed naphthalenesulfonic acid, 0.1 phm ammonium persulfate, 2.0 phm of a butadiene-styrene seed latex (particle size 600 angstroms) in a CSTR. Added to this mixture was 2% of the carboxylic acid component, 6.3% styrene, 3.5% butadiene, and 0.06 phm t-dodecyl mercaptan. The mixture was heated to 195° F and maintained at that temperature for the remainder of the reaction. A mixture of 56.7% styrene, 31.5% butadiene, and 0.54 phm t-dodecyl mercaptan was then fed continuously into the CSTR over a period of 5 hours. At the same time a mixture of 0.7 phm sodium dicyclohexyl sulfosuccinate and 10 phm of demineralized water was fed continuously into the CSTR for 5 hours and a mixture of 0.7 phm ammonium persulfate with 20 phm demineralized water was also fed for 5.5 hours into the CSTR. The reaction was polymerized to 98% conversion and cooled. The pH was adjusted to 8.0-8.5 with ammonia.

In compounding the latexes for the purpose of carpet coating, the pH of each latex was adjusted to 8.8 to 9.2 with ammonia. Up to 50 ppm of a suitable biocide was added to control contamination, along with up to 0.25% of an antioxidant to control aging. 100-200 pts of dry calcium carbonate (calculated on 100 parts dry latex) was added to the latex to bring the total system solids to 78.0%. The viscosity was increased to 8,000-9,000 cps with sodium polyacrylate thickener. The latex was then coated onto the reverse side of a tufted loop pile carpet which was then dried and cured in a 250°-280° F. oven for 10-20 minutes. The carpet was then tested for tuft bind in accordance with ASTM D 1335.

In the ASTM D 1335 test, the carpet backing was coated with a predetermined amount of latex, and the tensile force required to pull a cut loop from a cut pile floor covering was determined. The carpet sample for testing was large enough so that at least 5 pieces, each 6 inches wide and 8 inches long were cut from it. The results were as follows:

| ASTM D 1335 | Formula D | Formula E | Formula F |
|---|---|---|---|
| Tuft Bind, lbs average per tuft pull | 30.5 | 27.9 | 23.5 |

EXAMPLE 3

The following polymer formulation was prepared in accordance with the following procedure:

60 parts per hundred parts of monomer (phm) of demineralized water were contacted with 0.05 phm ethylene diamine tetraacetic acid (EDTA), 0.1 phm sodium dicyclohexyl sulfosuccinate, 0.1 phm ammonium persulfate, 2.0 phm of butadiene-styrene (BD/ST) seed latex (particle size 600 angstroms) in a continuous stirred tank reactor (CSTR). Added to this mixture was 6.6% styrene, 3.2% butadiene, 0.06 phm t-dodecyl mercaptan, and 2% of monomethyl maleate. The weight percents were based upon the 100 parts of monomer. This mixture was heated to 195° F. and maintained at that temperature for the remainder of the reaction.

A mixture of 59.4% styrene, 28.8% butadiene, and 0.54 phm t-dodecyl mercaptan was then fed continuously into the reactor over a period of 5 hours. At the same time a mixture of 0.3 phm sodium dicyclohexyl sulfosuccinate and 10 phm of demineralized water was fed continuously for 5 hours into the CSTR, and a mixture of 0.7 phm ammonium persulfate with 20 phm demineralized water was also fed into the CSTR for 5.5 hours. The reaction was polymerized to 98% conversion and cooled. The pH was adjusted to 8.0–8.5 with ammonia.

The formulation used to evaluate the latex for use in paper coating was an all-purpose roto/offset formulation consisting of 10 dry parts of the latex, 0.1 parts polyacrylate dispersant, 88.0 parts delaminated high brightness clay, 2.0 parts calcined clay, 10.0 parts titanium dioxide, 10.0 parts ethylated starch, 0.5 parts calcium stearate lubricant, and 0.7 parts insolubilizer (Sequa 700C, Sequa Chemicals, Inc.). These ingredients were combined and coated on unsized (2.5 caliper, 32 lbs/3000 square feet) basestock. The coat weight was 7.0 lbs/3300 square feet on a Keegan Blade Pilot Coater at a speed of 100 ft/min. The coated paper was then calendered at 5 nips at 1000 psi with a temperature setting of 150° F. and a speed of 100 feet per minute.

The coated, calendered paper was tested and found to have the following properties:

| | |
|---|---|
| Sheet gloss | 58.2 |
| Print gloss (avg) | 80.0 |
| Print density (avg) | 1.90 |
| Opacity (printers) | 90.8 |
| Brightness | 75.9 |
| % Brightness loss (K&N) | 15.1 |
| Porosity (Sheffield) | 97.0 |
| Smoothness (Parker print surf) | 1.63 |
| Wet pick-density (#2 ink @ 3 mls) | 0.92 |
| IGT (fpm) (#3 ink @ "A" setting) | 245 |

From this data the latex was found to have a superior sheet gloss and print gloss, while maintaining levels of all other factors tested within a good range. This indicates value as a latex for use as a binder in paper coating.

EXAMPLE 4

| | Weight % based on 100 parts monomer | | |
|---|---|---|---|
| Component | Formula G | Formula H | Formula I |
| Styrene | 44 | 43 | 43 |
| Butadiene | 50 | 50 | 49 |
| Methacrylic Acid | 1 | 1 | 1 |
| N-methylolacrylamide | 5 | 5 | 5 |
| Monomethyl maleate | 0 | 1 | 2 |

105 phm of demineralized water were contacted with 0.03 phm ethylene diamine tetraacetic acid (EDTA), 2.5 phm sodium lauryl sulfate, 0.1 phm ammonium persulfate in a continuous stirred tank reactor (CSTR). Added to this mixture was 4.4% styrene, 5.0% butadiene, 0.1% methacrylic acid, 0.04 phm t-dodecyl mercaptan, and the appropriate amount of monomethyl maleate; 0 in Formula G, 1% in Formula G, and 2% in Formula I. The mixture was heated to 176° F. and this temperature was maintained throughout the reaction. A mixture of 39.6% styrene, 45% butadiene, 0.9% methacrylic acid was fed continuously into the reactor over a period of 3.5 hours. At the same time a mixture of 5% n-methylolacrylamide, 0.75 phm sodium lauryl sulfate, and 15 phm demineralized water was fed continuously for 3.5 hours into the CSTR, and a mixture of 0.9 phm ammonium persulfate with 10 phm demineralized water was also fed into the CSTR for 4.0 hours. The latexes were adjusted to 8.0–8.5 pH with ammonia.

A compounded latex was prepared for use as a nonwoven binder using 100 parts (based on dry monomer), 0.5 parts antioxidant (Naugawhite, Uniroyal Inc.) 0.02 parts biocide (Proxel GXL, ICI Americas) 0.15 parts defoamer (Colloids 796R, Colloids Inc.) and 1.5 parts sodium salt of sulfated ethoxylated alcohol derivatives (anionic surfactant). These ingredients were combined, and the pH of the mixture was adjusted to 8.0–10.0 with ammonia. The formulated latex was then diluted to 7.5% solids, and 0.5 parts, ammonium chloride was added. #4 Whatman Chromatography paper was saturated by a dip and nip process to a 9% dry binder add-on. The saturated paper was dried at 300° F for 5 minutes in an air through oven. A tensile test (IST 110.0-70) was performed with an Instron machine and the following results were obtained:

| | Formula G | Formula H | Formula I |
|---|---|---|---|
| Machine Direction, (psi) | 18.9 | 22.9 | 23.2 |
| Cross Direction, (psi) | 14.6 | 14.7 | 15.8 |

These results indicate that with the incorporation of monomethyl maleate, an increase in dry strength was obtained.

What is claimed is:

1. A latex binder composition consisting essentially of:
   (a) about 2 to 90 weight % styrene;
   (b) about 15 to 98 weight % butadiene;
   (c) about 0.1 to 10 weight % of a monoester of maleic or fumaric acid having the following structure:

ROOC—CH=CH—COOH wherein R is a $C_1$ to $C_{12}$ alkyl group.

2. The composition of claim 1, also including up to about 10 weight % of a functional monomer selected from the group consisting of carboxylic acids, hydroxyl containing acrylic and methacrylic monomers, amides and acrylic and methacrylic acid derivatives and mixtures thereof.

3. The composition of claim 1 wherein (a) varies from about 20 to 70 weight %; (b; varies from about 30 to 80 weight %; and (c) varies from about 0.5 to 5 weight %.

4. The composition of claim 3 wherein (a) varies from about 25 to 60 weight %; (b) varies from about 40 to 75 weight and (c) varies from about 1 to 4 weight %.

5. The composition of claim 2 wherein the monomer varies from about 0.05 to 7 weight %.

6. The composition of claim 5 wherein the monomer varies from about 0.1 to 5 weight %.

7. The composition of claim 2 wherein the carboxylic acid is selected from the group consisting of acrylic acid, methacrylic acid, monomethyl itaconate, itaconic acid, fumaric acid, maleic acid, beta-carboxyl ethyl acrylate, and mixtures thereof.

8. The composition of claim 1, also including up to 7 weight % of at least one crosslinking agent selected from the group consisting of difunctional vinyl compounds and derivatives, divinyl benzene, N-methylol acrylamide, C1–C4 ethers of N-methylol acrylamide, diallyl maleate, di, tri, and tetra (meth)acrylates.

9. In a process for improving the bonding strength of an adhesive binder latex comprising a polymer emulsion of styrene and butadiene, the improvement which comprises incorporating in said polymer emulsion prior to or during the polymerization, about 0.1 to 10 weight % of a monoester of maleic or fumaric acid having the following structure:

$$ROOC-CH=CH-COOH$$

wherein R is an $C_1$ to $C_{12}$ alkyl group.

10. The process of claim 9, wherein R is a $C_1$ to $C_4$ alkyl group.

* * * * *

UNITED STATES PATENT AND TRADEMARK OFFICE
CERTIFICATE OF CORRECTION

PATENT NO.   :   5,093,449
DATED        :   March 3, 1992
INVENTOR(S)  :   Durney Cronin et al It is certified that error appears in the above-identified patent and that said Letters Patent is hereby corrected as shown below:

At column 6, line 19, change "-0.5" to -- 0.5 --.

At column 6, line 57, after "weight" insert -- & --.

Signed and Sealed this

Sixth Day of July, 1993

Attest:

MICHAEL K. KIRK

Attesting Officer

Acting Commissioner of Patents and Trademarks